US008630335B2

(12) United States Patent
Mizrahi et al.

(10) Patent No.: US 8,630,335 B2
(45) Date of Patent: Jan. 14, 2014

(54) SNR ESTIMATION

(75) Inventors: Haggai Mizrahi, Petach-Tikva (IL);
Isaac Rosenhouse, Kiryat-Ono (IL)

(73) Assignee: Ceragon Networks Ltd., Tel-Aviv (IL)

( * ) Notice: Subject to any disclaimer, the term of this patent is extended or adjusted under 35 U.S.C. 154(b) by 187 days.

(21) Appl. No.: 13/122,565

(22) PCT Filed: Oct. 6, 2008

(86) PCT No.: PCT/IL2008/001326
§ 371 (c)(1),
(2), (4) Date: Apr. 5, 2011

(87) PCT Pub. No.: WO2010/041233
PCT Pub. Date: Apr. 15, 2010

(65) Prior Publication Data
US 2011/0188561 A1    Aug. 4, 2011

(51) Int. Cl.
*H04B 3/46*        (2006.01)
(52) U.S. Cl.
USPC ........................................................ 375/227
(58) Field of Classification Search
USPC .................. 375/222, 227, 148, 329, 226
See application file for complete search history.

(56) References Cited

U.S. PATENT DOCUMENTS

| | | | | |
|---|---|---|---|---|
| 6,229,842 | B1* | 5/2001 | Schulist et al. | 375/148 |
| 6,760,370 | B2* | 7/2004 | Li et al. | 375/227 |
| 2006/0072656 | A1* | 4/2006 | Wiss et al. | 375/226 |
| 2008/0219472 | A1* | 9/2008 | Chhatwal et al. | 381/94.3 |
| 2010/0316094 | A1* | 12/2010 | Tung | 375/150 |

FOREIGN PATENT DOCUMENTS

WO    WO 2007/113511    10/2007

OTHER PUBLICATIONS

International Preliminary Report on Patentability Dated Apr. 21, 2011 From the International Bureau of WIPO Re. Application No. PCT/IL2008/001326.
International Search Report Dated Jul. 3, 2009 From the International Searching Authority Re.: Application No. PCT/IL2008/001326.
Written Opinion Dated Jul. 3, 2009 From the International Searching Authority Re.: Application No. PCT/IL2008/001326.

* cited by examiner

*Primary Examiner* — Jaison Joseph

(57) ABSTRACT

A method for estimating a Signal to Noise Ratio (SNR) in a received signal including, for a fixed first set of a plurality of samples from the received signal, providing an initial noise estimate, starting with the initial noise estimate, iteratively improving the noise estimate, and estimating SNR based, at least partly, on the fixed first set of samples from the received signal and the noise estimate. Additional related apparatus and methods are also described.

16 Claims, 9 Drawing Sheets

SNR ESTIMATION

RELATED APPLICATIONS

This application is a National Phase of PCT Patent Application No. PCT/IL2008/001326 having International filing date of Oct. 6, 2008. The contents of the above application is incorporated herein by reference.

FIELD AND BACKGROUND OF THE INVENTION

The present invention relates to a method for Signal to Noise Ratio (SNR) estimation in a communication system and, more particularly, but not exclusively to a method for SNR estimation in a wireless communication system which uses Adaptive Coding and Modulation (ACM).

Wireless communication links are known to be sensitive to time-varying propagation conditions.

Wireless communication links may have multiple propagation paths with different attenuation and delay characteristics, and produce an effect known as fading. Millimeter wave communication links may be affected by fading caused by rain attenuation. In some communication links co-channel and adjacent-channel signals introduce interference which degrades quality of a received signal. These phenomena, which are time-varying, reduce the Signal to Noise Ratio (SNR) which is produced at a receiver output.

Channel capacity is a term used for a mathematical measure of a data rate which may be transmitted over a given channel with no errors. The channel capacity is proportional to a logarithm of the channel SNR. An SNR increment of 3 dB increases the channel capacity by approximately 1 bit per Hz. As described above, channel capacity is time-varying.

Some modern communication systems try to maximize communication rate by transmitting at a data rate which tracks the time-varying channel capacity. For this purpose a channel SNR estimator is typically included in the communication systems. The modulation type and coding rate of the communication system are typically selected from a predetermined set according to the estimated SNR, and possibly according to adaptive SNR threshold levels. Such systems are referred to herein as Adaptive Coding and Modulation (ACM) systems or Adaptive Modulation and Coding (AMC) systems.

Typical operation of an ACM system is as follows. A receiver estimates the channel SNR as an indication of communication quality. If the quality is sufficiently high that upgrading of the communication data rate is possible, the receiver sends a request for an upgraded coding/modulation scheme to the transmitter on a return link. A similar procedure takes place when the communication quality nears a threshold of operation in which intolerable errors may occur. In such a case, the transmission switches to a lower communication rate.

If a receiver does not estimate SNR correctly and rapidly, reflecting channel quality changes, communication quality suffers in at least the following ways. If SNR is estimated too high, transmission may continue at its previous rate, and a receiver may completely lose ability to decode, leading to complete breakdown of communication. If SNR is estimated too low, the communication system uses a too conservative coding/modulation scheme, losing rate relative to what could actually be used. Slowly, the conservative coding/modulation scheme is upgraded because the communication link SNR is actually higher than initially estimated. SNR estimation is a common problem in miscellaneous systems and particularly in communication systems. A received signal contains a transmitted signal with additive noise. A ratio between signal power and noise power is an important measure of channel quality. Measurement of SNR is required for various applications such as adaptive coding, adaptive modulations, error correcting code, dynamic PLL bandwidth etc.

The SNR measurement problem is usually simple when signal and noise can be separated. In such a case SNR is estimated using a Mean Square Error (MSE) estimator. An MSE estimator is a decision directed, or data aided, estimator which takes a difference between a received signal and symbols decoded from the received signal, and calculates the mean square error. Such an estimator can be efficient when transmitted symbols are discrete and the receiver is phase-locked.

However, in low SNR, when the receiver is not phase-locked, the above method cannot estimate SNR accurately, because the decisions are not reliable.

Therefore, for low SNR, a non-data aided (NDA) estimator is needed. An NDA estimator is an estimator that estimates SNR without knowledge of the actual transmitted data.

The following are some references which describe SNR estimation.

U.S. Pat. No. 6,760,370 to Li at el. teaches a method for estimating signal-to-noise ratio (SNR) using a method with low bias that is effective for both positive SNRs and small to negative SNRs. The method is based on an iterative solution for the maximum likelihood estimate of the amplitude from which the SNR can be computed. The method is applicable for various modulated systems, including BPSK, QPSK and MPSK.

U.S. Pat. No. 6,611,794 to Fleming-Dahl teaches an apparatus for signal amplitude restoration having a received signal input and a scaled received signal output. An amplitude correction factor generator has an estimated signal-to-noise power ratio input and a received signal input. A variable gain amplifier uses the correction factor generator output to control its gain, and amplifies or attenuates the received signal input to provide the scaled received signal output. An average SNR estimator uses the amplifier output as its input, and provides an output connected to the estimated signal-to-noise power ratio input. The apparatus processes received signals in an iterative fashion, such that at least one of the outputs is stored for use as a feedback input during later iterations.

US Published Patent Application 2004/0264588 of Song et al. teaches a method and device for adaptive modulation and coding based on second order statistics of channel information in OFDM system, characterized in that, by means of variance of Signal-to-Noise ratio (SNR) an appropriate adaptation time window is selected dynamically to trace time-varying channel better; and in that a decision criterion of second order, namely selecting an appropriate modulation and coding schemes (MCS) according to average value of SNR and variance of SNR, is employed to obtain accurate mapping from SNR to MCS. The mapping enhances practicability of the adaptive modulation and coding, decreases probability of system outage, and thus results in better performance of bit error rate.

US Published Patent Application 2004/0081259 of Ammer et al. teaches a receiver for iterative decoding of a received, encoded signal that employs slot-based scaling of soft samples. Iterative decoding employs a constituent maximum a priori (MAP) decoder for each constituent encoding of information of the encoded signal. Root mean square (RMS) values for soft samples over a slot are selected for dynamic range scaling. Squared RMS values are combined and equal the squared RMS value for a frame multiplied by a control constant, and this relationship may be employed to derive scaling constants for each slot. Alternatively, the square root of the RMS value multiplied by a constant serves as an SNR estimator that may be employed to scale samples to reduce dynamic range and modify logarithmic correction values for max* term calculation during log-MAP decoding.

US Published Patent Application 2005/0169391 of Takeda et al. teaches a radio communications system for performing communications based on an adaptive modulation by selecting one MCS from a set of MCSs each comprising a combination of a modulation scheme and a coding scheme which are ranked according to a transmission rate, the radio communications system comprising a change unit to change the selected MCS to a MCS of a higher ranking than the selected MCS when communication quality exceeds a first threshold, and change the selected MCS to a MCS of a lower ranking than the selected MCS when the communication quality is less than a second threshold lower than the first threshold, a first threshold controller to control the first threshold based on a first error rate, and a second threshold controller to control the second threshold based on a second error rate different from the first error rate.

An article titled "The joint estimation of signal and noise from the sum envelope", by Benedict and Soong, published in IEEE Trans. Inform. Theory, vol. IT-13, no. 3, pp. 447-454, 1967, teaches computing the SNR from high order averages of an envelope of a modulated signal.

An article titled "SNR Estimation for non-Constant Modulus Constellations", by Ping Gao and Cihan Tepedelenlioglu, published in IEEE Trans. Signal Processing vol. 53, no. 3, March 2005, pp. 865-870.

An article titled "Maximum likelihood from incomplete data via the EM algorithm", by Dempster, Laird & Rubin, in the Journal of the Royal Statistical Society, Series B (Methodological), Vol. 39, No. 1 (1977), pp. 1-38.

SUMMARY OF THE INVENTION

The present invention relates to a method for Signal to Noise Ratio (SNR) estimation in a communication system and, more particularly, but not exclusively to a method for SNR estimation in a communication system which uses Adaptive Coding and Modulation (ACM).

In a communication system which sends coded symbols, there is an expected distribution of received symbol magnitudes.

Embodiments of the invention are based on having an expectation of a Probability Distribution Function (PDF), or envelope, of magnitudes of received symbols, and measuring a deviation from the expected PDF. The deviation is considered an estimation of noise, and SNR is estimated based on the estimation of the noise.

Embodiments of the invention optionally make a first noise estimate by measuring a set of magnitudes of samples of the received signal, and comparing the measurements to expected magnitudes.

Embodiments of the invention optionally improve on the first estimate by iteratively performing two calculations on the set of magnitudes. The first calculation evaluates the probabilities that the expected magnitudes correspond to the measured magnitudes, given the previous noise estimate. The second calculation selects a noise power that maximizes the likelihood of obtaining the received magnitudes based on the probability evaluated in the first step.

The iterations continue until reaching some stop criterion. Non-limiting examples of stop criteria include when the change in the noise estimation falls below a threshold; and when the time taken to estimate the SNR extends beyond a time limit.

Some embodiments of the invention are based on an Expectation Maximization (EM) method.

A receiver estimating SNR using embodiments of the invention provides SNR estimates when a receiver which estimates SNR using a conventional data aided approach to SNR estimation cannot. The conventional data aided approach to SNR estimation requires that the receiver carrier phase tracking mechanism produce correct phase estimations, also termed as the receiver being phase-locked. When the receiver loses phase-lock, the receiver cannot decode data correctly, therefore counts a large number of errors, leading to a high error rate, leading to an estimation of SNR which is better, that is larger, than the actual SNR. Embodiments of a receiver constructed and operational according to the invention do not need to be phase-locked in order to produce an SNR estimate.

It is noted that providing better SNR estimates results in faster tracking of changing communication channel conditions and thereby in maintaining higher bit rates in the communication system.

According to an aspect of some embodiments of the present invention there is provided a method for estimating a Signal to Noise Ratio (SNR) in a received signal including, for a fixed first set of a plurality of samples from the received signal, providing an initial noise estimate, starting with the initial noise estimate, iteratively improving the noise estimate, and estimating SNR based, at least partly, on the fixed first set of samples from the received signal and the noise estimate.

According to some embodiments of the invention, the iteratively improving includes a fixed additional set of samples from the received signal and iteratively improving the noise estimate based, at least in part, on both the fixed first set of samples and the fixed additional set of samples.

According to some embodiments of the invention, a first noise estimate is based on the fixed first set of samples, an additional noise estimate is based on the fixed additional set of samples, and a final noise estimate, on which the estimating SNR is at least partly based, is a linear combination of the first noise estimate and the additional noise estimate.

According to some embodiments of the invention, and further having more than one additional fixed sets of noise estimates, and estimating SNR based, at least partly, on combining noise estimates from each of the first noise estimate and the additional noise estimates.

According to some embodiments of the invention, the additional fixed sets of samples each includes a single sample.

According to some embodiments of the invention, the iteratively improving is performed using an iterative Expectation Maximization (EM) method.

According to some embodiments of the invention, the iterative EM method includes (a) calculating a matrix of probability coefficients $C_{i,j}$ indicating probabilities of each one of a set of valid magnitudes $\mu_j$ corresponding to each one of measured magnitudes $y_i$, of the samples, given the noise estimate, and (b) re-estimating the noise estimate to maximize a likelihood of obtaining the measured magnitudes $y_i$, given the matrix of probability coefficients $C_{i,j}$, the set of valid magnitudes, and the previous noise estimate, and repeating (a) and (b) until reaching a stop criterion.

According to an aspect of some embodiments of the present invention there is provided a method for estimating a Signal to Noise Ratio (SNR) in a received signal including, for a fixed set of a plurality of samples from the received signal, measuring magnitudes of the samples, obtaining a set of valid magnitudes, based, at least partly, on the measured magnitudes and on an expected modulation scheme, providing an initial noise estimate based, at least partly, on the measured magnitudes, starting with the initial noise estimate (a) calculating a matrix of probability coefficients $C_{i,j}$ indicating probabilities of each valid magnitude $\mu_j$ to correspond to each measured magnitude $y_i$, given the noise estimate, (b) selecting a noise estimate which maximizes a likelihood of sampling the measured magnitudes, given the matrix of probability coefficients $C_{i,j}$, the measured magnitudes, and the previous noise estimate, and estimating SNR based, at least partly, on the measured magnitudes and the noise estimate.

According to some embodiments of the invention, the noise estimate includes a noise variance.

According to some embodiments of the invention, (a) and (b) are repeated until reaching a stop criterion. According to some embodiments of the invention, the stop criterion includes when the Maximization step changes the noise estimate by less than a threshold amount. According to some embodiments of the invention, the stop criterion includes iterating no more than a defined number of iterations. According to some embodiments of the invention, the stop criterion includes iterating no more than a specified period of time.

According to some embodiments of the invention, the received signal is one of the group consisting of a variable-magnitude signal, a variable-magnitude variable-phase signal, Quadrature Amplitude Modulation (QAM) signal, and a signal using Adaptive Coding and Modulation (ACM).

According to some embodiments of the invention, the method irrespective of whether a receiver receiving the signal is phase-locked.

According to an aspect of some embodiments of the present invention there is provided a method for estimating a Signal to Noise Ratio (SNR) in a received signal including measuring magnitudes of a fixed set of a plurality of samples from the received signal, obtaining a set of valid magnitudes, based, at least partly, on the measured magnitudes and on an expected modulation scheme of the received signal, calculating a noise estimate based on the differences between the set of valid magnitudes and the measured magnitudes, and estimating SNR based, at least partly, on the measured magnitudes and on the noise estimate.

According to some embodiments of the invention, the calculating a noise estimate is based on an equally weighted average of the differences between the set of valid magnitudes and the measured magnitudes. According to some embodiments of the invention, the calculating a noise estimate includes Non-Data-Aided decisions about the set of samples of the received signal.

According to some embodiments of the invention, the calculating a noise estimate is performed as follows: for each measured magnitude in the set of samples subtracting the measured magnitude from a nearest magnitude in the set of valid magnitudes, thereby calculating a single difference, and squaring the single difference, and summing the squares of the single differences and dividing by the number of measured magnitudes.

According to some embodiments of the invention, the subtracting and the squaring is performed only for measured magnitudes above a threshold magnitude. According to some embodiments of the invention, the threshold magnitude is between a maximum expected magnitude and a next-smaller expected magnitude. According to some embodiments of the invention, the subtracting and the squaring is performed only for measured magnitudes between a lower threshold and an upper threshold.

According to an aspect of some embodiments of the present invention there is provided a method for estimating a Signal to Noise Ratio (SNR) in a received signal including the above-mentioned methods for estimating SNR including iteratively improving the noise estimate, in which the calculating an initial noise estimate includes calculating a noise estimate according to any one of the above-mentioned methods for calculating a noise estimate.

According to an aspect of some embodiments of the present invention there is provided a receiver in an Adaptive Coding and Modulation (ACM) communication system including an SNR estimation unit configured to estimate SNR according to the method of any one of claims 1-23, at least in case of carrier phase-lock loss, and a modulation and coding unit configured to receive the estimate of the SNR from the SNR estimation unit and produce a modulation and coding scheme request based, at least partly, on the estimate of the SNR.

According to an aspect of some embodiments of the present invention there is provided a communication system including a live receiver and a backup receiver, wherein at least the backup receiver is configured to receive a signal and estimate a Signal to Noise Ratio (SNR) in the received signal according to any of the above-mentioned methods.

According to some embodiments of the invention, the system is an Adaptive Coding and Modulation (ACM) system.

According to an aspect of some embodiments of the present invention there is provided a receiver operative to estimate a Signal to Noise Ratio (SNR) in a received signal including means for measuring magnitudes of a set of samples of the received signal, means for obtaining a set of valid magnitudes, means for calculating an initial noise estimate using differences between the set of valid magnitudes and the measured magnitudes of the set of samples, thereby producing a noise estimate, means for iteratively improving the noise estimate, and means for estimating SNR based, at least partly, on the measured magnitudes and on the noise estimate.

According to an aspect of some embodiments of the present invention there is provided a receiver operative to estimate a Signal to Noise Ratio (SNR) in a received signal including means for measuring magnitudes of a fixed set of a plurality of samples of the received signal, means for obtaining a set of valid magnitudes based, at least partly, on the measured magnitudes and on an expected modulation scheme, means for calculating a noise estimate based on the differences between the set of valid magnitudes and the measured magnitudes, and means for estimating SNR based, at least partly, on the estimated magnitude distribution of the expected symbols and on the noise estimate.

According to an aspect of some embodiments of the present invention there is provided a receiver operative to estimate a Signal to Noise Ratio (SNR) in a received signal including means for measuring magnitudes of a fixed set of a plurality of samples of the received signal, means for obtaining a set of valid magnitudes, based, at least partly, on the measured magnitudes and on an expected modulation scheme of the received signal, means for calculating an initial noise estimate based on the differences between the set of valid magnitudes and the measured magnitudes, thereby producing a noise estimate, means for iteratively improving the noise estimate, and means for estimating SNR based, at least partly, on the measured magnitudes and on the noise estimate.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
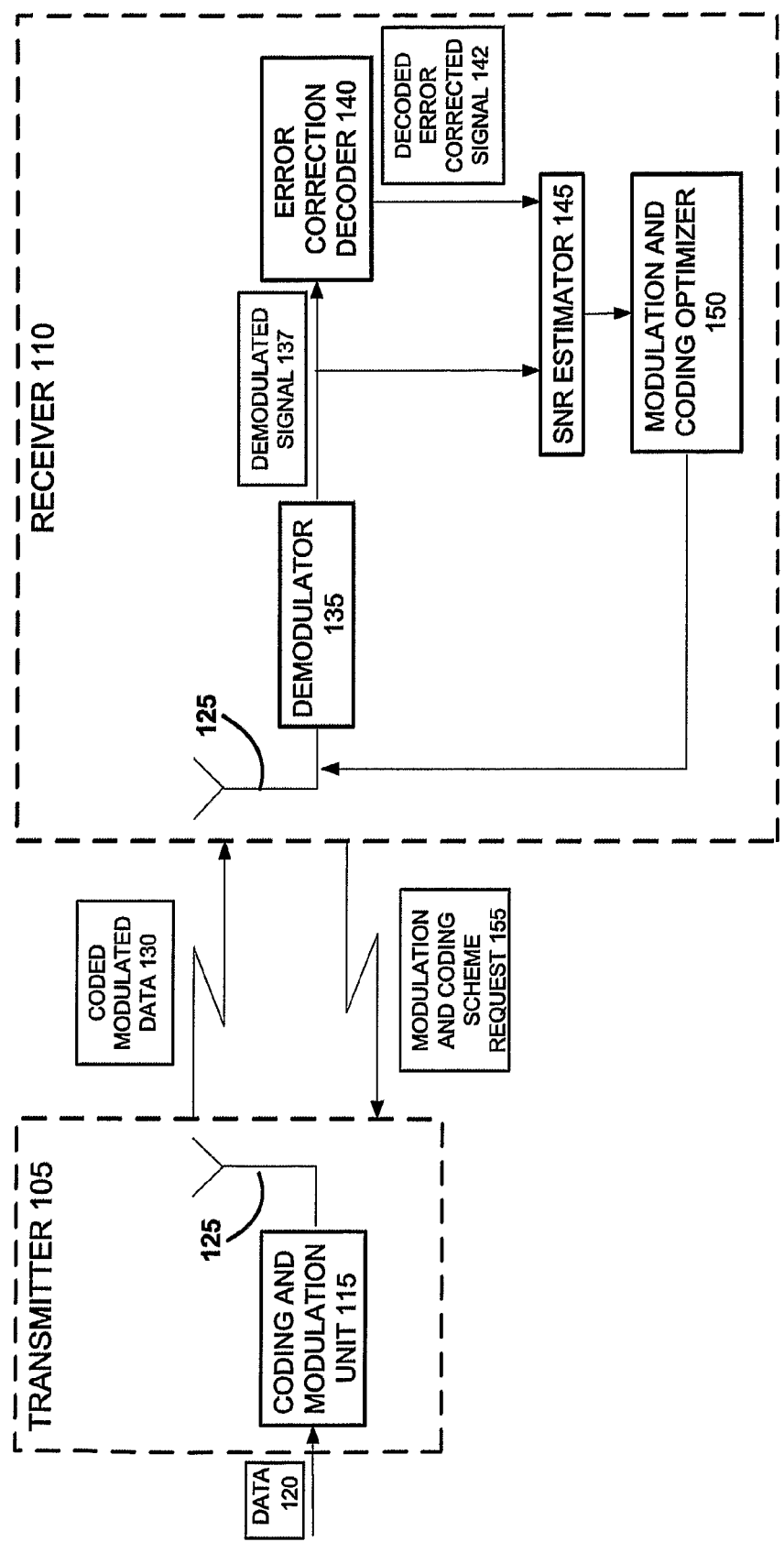
FIG. 1 is a simplified diagram of a typical prior art point to point ACM communication system.

The present invention, in some embodiments thereof, relates to a method for Signal to Noise Ratio (SNR) estimation in a communication system and, more particularly, but not exclusively to a method for SNR estimation in a communication system which uses Adaptive Coding and Modulation (ACM). The SNR estimates may then be used to dynamically select ACM parameters. The ACM parameters include, by way of a non-limiting example, an optimal modulation and coding combination, transmission power, pilot symbols power and density, transmitted spectral density, bandwidth, and other parameters.

Example embodiments of an SNR estimator described herein estimate SNR in variable-amplitude, in variable-phase, and in variable-amplitude variable-phase communications systems.

The communication system transmits signals modulated, in amplitude, in phase, in frequency, or in some combination of the above, as is well known in the art.

Example embodiments of the invention provide a method for SNR estimation particularly, but not exclusively, in a communication system which uses Adaptive Coding and Modulation (ACM).

In a communication system which sends coded symbols, there is an expected distribution of received signal magnitudes. Embodiments of the SNR estimation method are based on having an expectation of a Probability Distribution Function (PDF), or envelope, of magnitudes of received symbols, and measuring a deviation from the expected PDF.

It is noted that measuring a deviation from the expected magnitude distribution can be done by a receiver which receives a low quality signal which does not enable phase-locking and/or does not enable a data aided approach to SNR estimation.

Embodiments of the invention optionally make a first noise estimate by measuring a set of magnitudes of samples of the received signal, and comparing the set of measurements to expected magnitudes.

Sometimes the first noise estimate is good enough for estimating SNR. In some embodiments of the invention a symbol error probability is calculated, by way of a non-limiting example analytically, using mathematical expressions suitable for the modulation scheme, as may be found in any standard communications text book. If the symbol error probability is less than a defined threshold, such as, by way of a non-limiting example, $10^{-4}$, the first noise estimate is considered good enough as an SNR estimate.

Embodiments of the invention optionally improve on the first estimate by iteratively calculating the probabilities that the expected magnitudes correspond to the measured magnitudes, given the noise estimate, and re-estimating a noise level which maximizes the probability of receiving the measured magnitudes given the expected magnitudes.

The iteration continues until reaching some stop criterion. Non-limiting examples of stop criteria include when the change in the noise estimation falls below a threshold; when a threshold number of iterations has been made; and when the time taken to estimate the SNR extends beyond a time limit.

Example embodiments of the SNR estimation are optionally based on a magnitude distribution of the set of samples and are therefore insensitive to carrier signal phase. A receiver making the estimation using the example embodiment is not dependent on being phase-locked to the carrier signal phase.

The example embodiments can handle constant amplitude constellations, such as, by way of a non-limiting example, Phase Shift Keying (PSK) and Frequency Shift Keying (FSK), and non-constant amplitude constellations, such as, by way of a non-limiting example, Quadrature Amplitude Modulation (QAM).

For purpose of better understanding some embodiments of the present invention, as illustrated in FIGS. 2, 4, 5, 6A-6B and 8 of the drawings, reference is first made to FIG. 1, which is a simplified diagram of a typical prior art point to point ACM communication system.

The ACM system includes a transmitter 105 and a receiver 110.

The transmitter 105 includes a coding and modulation unit 115, with an input for communication data 120, and an antenna 125 for transmitting coded and modulated data 130.

The receiver 110 includes an antenna 125, a demodulator 135, an error correction decoder 140, an SNR estimator 145, and a modulation and coding optimizer 150.

The coding and modulation unit 115 of the transmitter 105 codes and modulates incoming data 120, and transmits the coded and modulated data 130 to the receiver 110.

The antenna 125 of the receiver 110 receives the coded and modulated data 130 and provides the coded and modulated data 130 as input to the demodulator 135. The demodulator 135 produces a demodulated but still coded signal 137, and sends the demodulated signal 137 to the error correction decoder 140 and to the SNR estimator 145.

The error correction decoder 140 decodes and error corrects the demodulated signal 137, and produces a decoded signal 142, and sends the decoded signal 142 to the SNR estimator 145.

The SNR estimator 145 compares the decoded signal 142 with the demodulated signal 137, and estimates an error rate, and/or translates the error rate to a Signal to Noise Ratio (SNR).

It is noted that the SNR estimation described above with reference to FIG. 1, which depicts a prior art communication system, uses a decision directed approach to decoding symbols and measuring SNR.

The SNR estimator 145 sends the estimate of the SNR to the modulation and coding optimizer 150. Based on the estimate of the SNR, the modulation and coding optimizer 150 may or may not send a request 155 for changing the modulation and coding scheme via the antenna 125 to the transmitter 105.

An SNR Estimation Method

An SNR estimation method according to an exemplary embodiment of the invention is now described.

Exemplary embodiments of the SNR estimation method are termed Non Data Aided (NDA) methods, and also termed blind methods. Such methods are not based on making decisions regarding the transmitted symbols, or on decoding transmitted symbols, and do not require a receiver to be phase locked. Such methods are therefore well suited for use in low SNR situations.

Figure 2A:
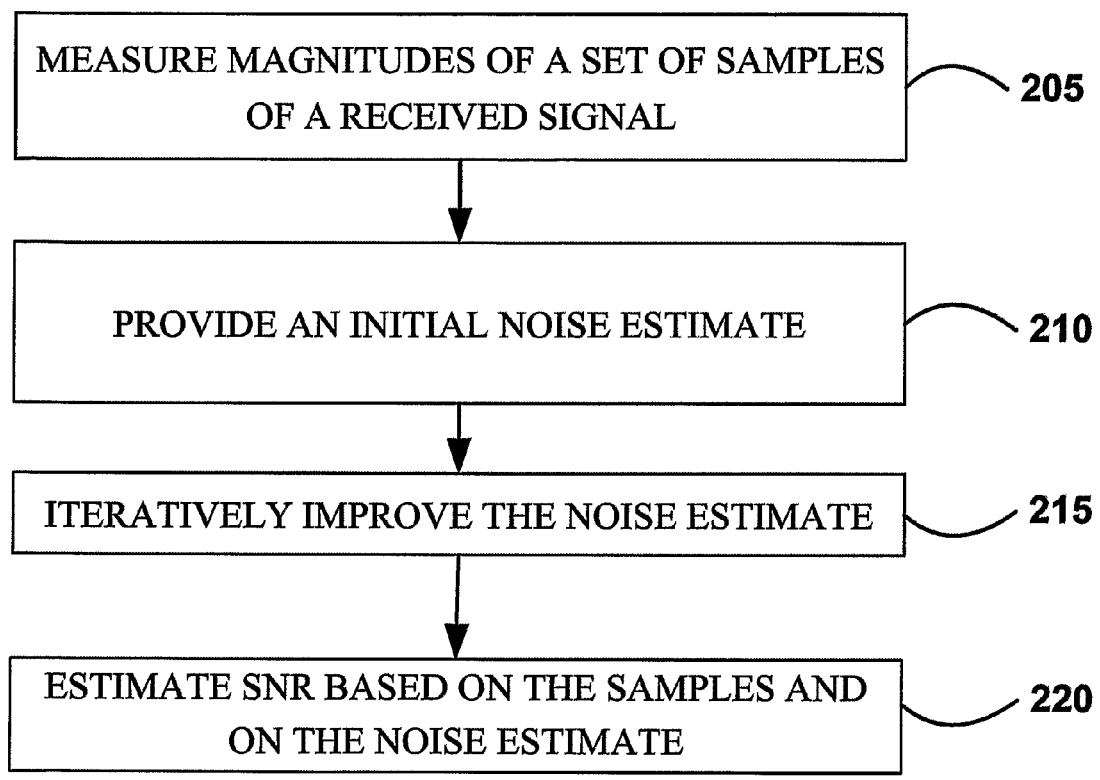
FIG. 2A is a simplified flow diagram of a first SNR estimation method operative in accordance with an example embodiment of the present invention.

Reference is now made to FIG. 2A, which is a simplified flow diagram of a first SNR estimation method operative in accordance with an example embodiment of the present invention.

First, magnitudes of a set of samples of a received signal are measured (205).

Next, an initial noise estimate is made (210). A description of an example method for calculating an initial noise estimate is further described below with reference to FIGS. 4, 5, 6A, and 6B.

Next, the noise estimate is iteratively improved (215). An example method of iterative improvement is further described below with reference to FIG. 4.

Finally, SNR is estimated, using the measured magnitudes of the set of samples of the received signal as the signal, and the noise estimate from the iterations as the noise.

Figure 2B:
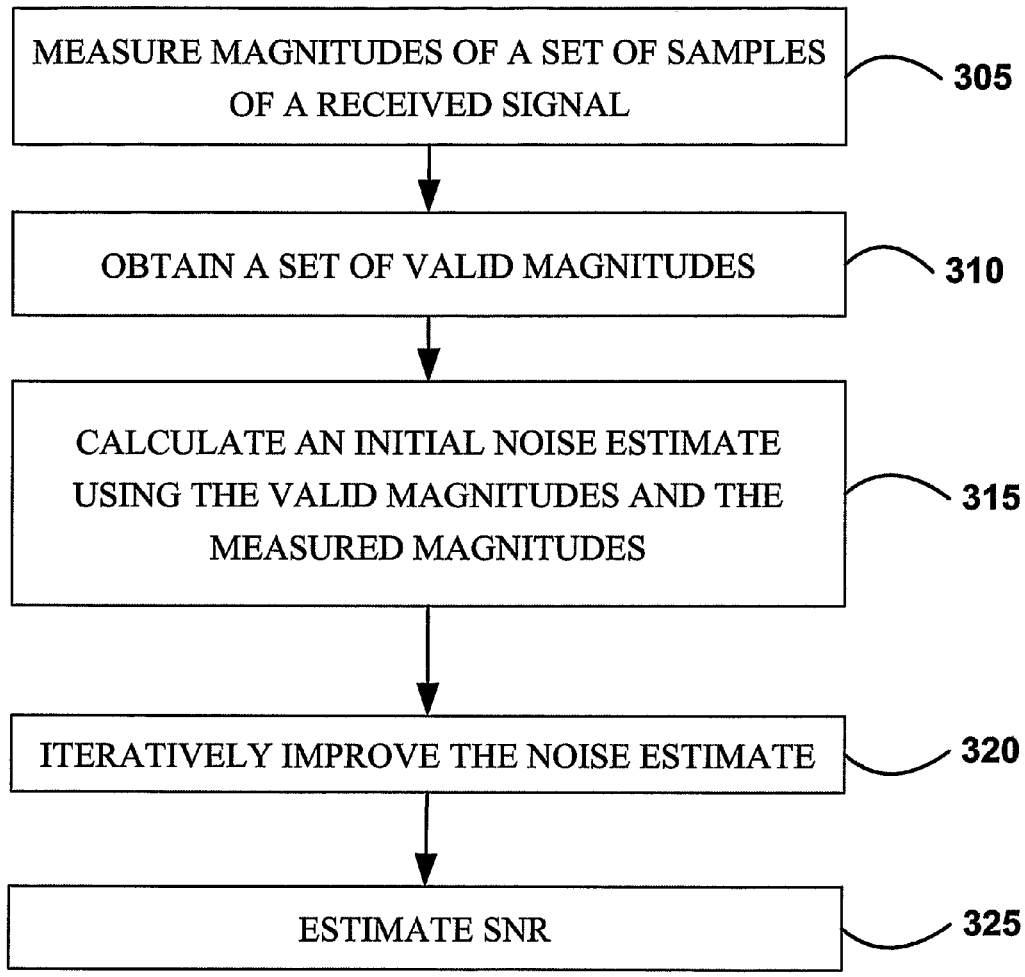
FIG. 2B is a simplified flow diagram of a second SNR estimation method operative in accordance with an example embodiment of the present invention.

Reference is now made to FIG. 2B, which is a simplified flow diagram of a second SNR estimation method operative in accordance with an example embodiment of the present invention.

First, magnitudes of a set of samples of a received signal are measured (305).

Next, a set of valid, expected, magnitudes is obtained, based on knowing an expected modulation scheme, and on the measured magnitudes (310). The expected modulation scheme is known by the receiver. An example of a relatively complicated magnitude distribution of expected symbols is the magnitude distribution of the 256 QAM modulation scheme, depicted in FIG. 3A. An example of a simpler magnitude distribution of expected symbols is the magnitude distribution of the 16 QAM modulation scheme. An example of an even simpler magnitude distribution of expected symbols is a fixed-magnitude modulation scheme, in which case expected magnitudes are all equal to a single magnitude, or radius.

The set of valid magnitudes and/or the received magnitudes are optionally amplified and/or attenuated appropriately. Appropriate magnification and/or attenuation, by way of non-limiting examples, is such that the average of the valid magnitudes is equal to the average magnitude of the samples of the received signal, and/or such that the power of the valid magnitudes is equal to the power of the samples of the received signal.

Next, an initial noise estimate is made (315), using the valid magnitudes and the measured magnitudes of the set of samples. A description of an example method for calculating an initial noise estimate is further described below with reference to FIGS. 4, 5, 6A, and 6B.

Next, the noise estimate is iteratively improved (320). An example method of iterative improvement is further described below with reference to FIG. 4.

Finally, SNR is estimated, using the measured magnitudes of the set of samples of the received signal as the signal, and the noise estimate from the iterations as the noise.

It is noted that when a receiver carrier phase tracking mechanism fails to produce correct phase estimations, the receiver using embodiments of the invention provides better SNR estimates than a receiver which estimates SNR using a conventional data aided approach to SNR estimation.

It is noted that providing better SNR estimates results in faster tracking of changing communication channel conditions and thereby in maintaining higher bit rates in the communication system.

A Mathematical Model of Noise in a Transmitted Signal

A mathematical model of noise in a transmitted signal assumes, by way of a non-limiting example, samples from a rotating constellation, for example QAM, immersed in Additive White Gaussian Noise (AWGN). An i-th sample of a received signal, z[i], is given by:

$$z[i] = (I[i] + j \cdot Q[i]) \cdot e^{j\phi[i]} + n_i[i] + j \cdot n_q[i] \quad \text{(Equation 1)}$$

where I[i] and Q[i] denote I and Q components of an i-th transmitted symbol, φ[i] denotes a rotation angle, and $n_i[i]$ and $n_q[i]$ denote I and Q components of the additive noise. Variances of the additive noise components are denoted by $\sigma_{n_i}^2$ and $\sigma_{n_q}^2$ respectively. The variances are assumed to be substantially identical to each other.

The terms "rotation", "angle", and "tangential" in all their grammatical forms are used throughout the present specification and claims interchangeably with the term "phase" and its corresponding grammatical forms.

The terms "amplitude" and "radial" in all their grammatical forms are used throughout the present specification and claims interchangeably with the term "magnitude" and its corresponding grammatical forms.

Complex noise samples may also be decomposed into radial and tangential components relative to corresponding rotated constellation points. Variances of the radial and tangential components of the noise are assumed equal to the variances of the I and the Q components of the noise. In the following derivation we shall denote variance of the radial noise components by $\sigma_r^2$.

For simplifying expressions, the symbol index i will be omitted, unless necessary.

An estimate of SNR can be expressed, in units of dB, as:

$$SNR = 10 \cdot \log_{10}\left(\frac{E\{I^2 + Q^2\}}{\sigma_{n_i}^2 + \sigma_{n_q}^2}\right) \quad \text{(Equation 2)}$$

where $E\{I^2 + Q^2\}$ is the statistical mean of $I^2 + Q^2$.

Given measurements which contain magnitudes of N received signal samples:

$$y[i] = |z[i]|, \; i = 1 \ldots N \quad \text{(Equation 3)}$$

Substituting Equation 3 into Equation 2, using radial notation, and relying on the fact that all the variables are independent, yields the following expression:

$$SNR = 10 \cdot \log_{10}\left(\frac{E(z^2) - 2\sigma_r^2}{2\sigma_r^2}\right) \quad \text{(Equation 4)}$$
$$= 10 \cdot \log_{10}\left(\frac{E(z^2)}{2\sigma_r^2} - 1\right)$$

The power of the signal is estimated by averaging the squared measured magnitudes. Estimating $\sigma_r^2$ represents a more complicated problem, which requires estimating the variance of radial noise.

Figure 3A:
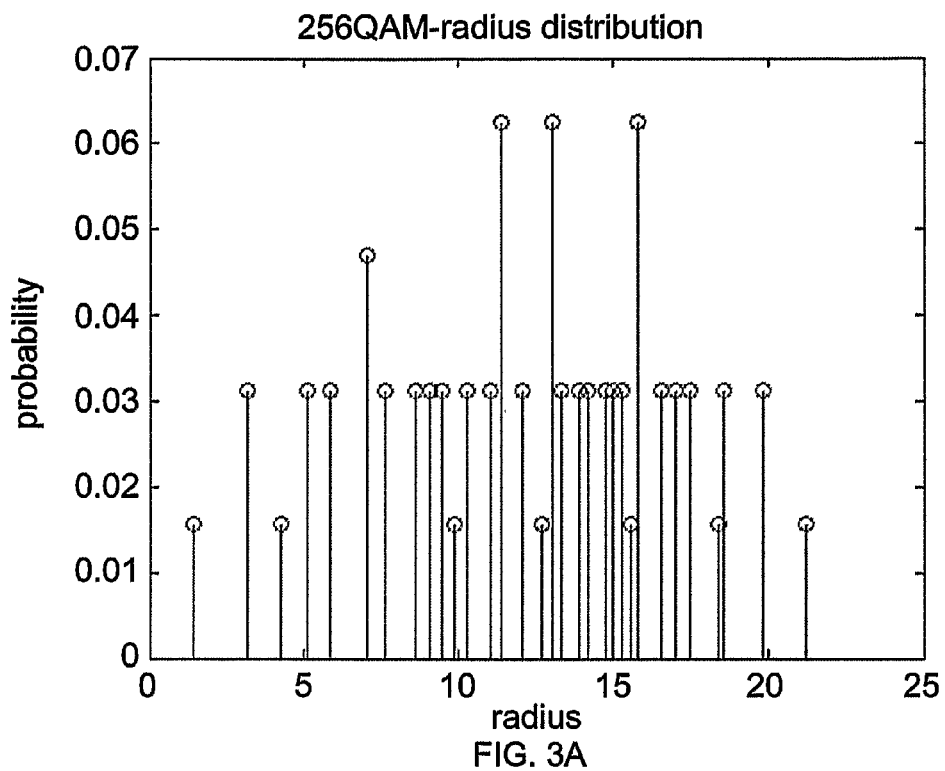
FIG. 3A is a graph illustrating a probability distribution of magnitudes of a 256 QAM signal with no additive noise.

Reference is now made to FIG. 3A, which is a probability distribution of magnitudes of a 256 QAM signal with no additive noise. FIG. 3A is based on a simulation including 4096 samples.

FIG. 3A represents a pure signal, with no additive noise, and depicts the probability (on the y-axis) that a symbol be received at a specific radius, or amplitude (on the x-axis).

Figure 3B:
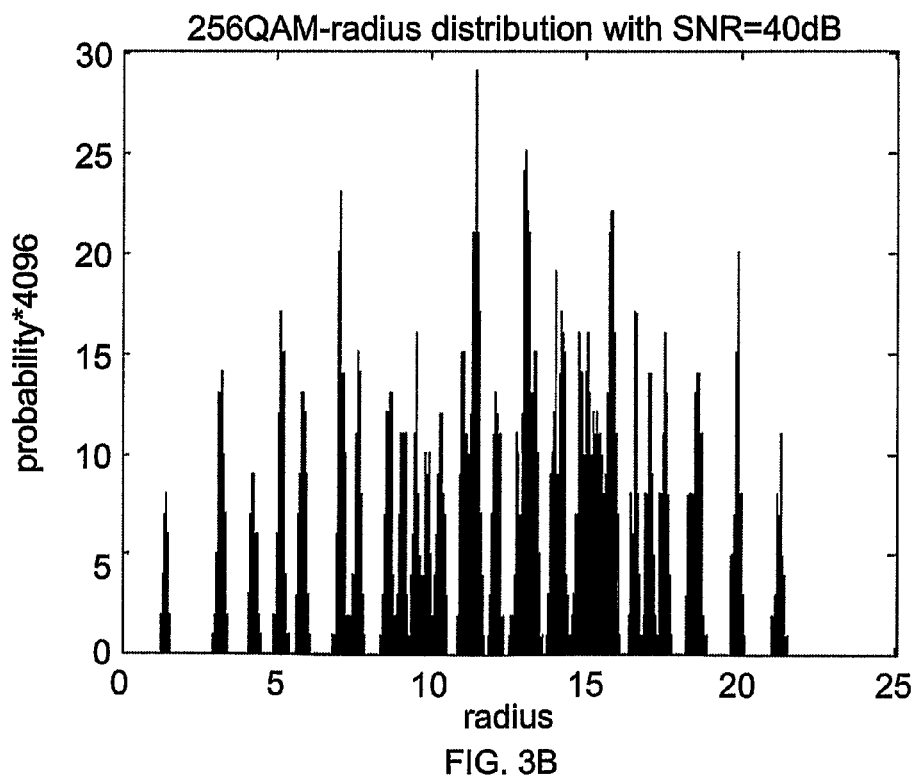
FIG. 3B is a graph illustrating a probability distribution of magnitudes of a 256 QAM signal with a signal having additive noise at SNR=40 dB.

Reference is now made to FIG. 3B, which is a probability distribution of magnitudes of a 256 QAM signal with a signal having additive noise at SNR=40 dB. FIG. 3B is also based on a simulation including 4096 samples.

FIG. 3B represents a somewhat noisy signal, and also depicts the probability (on the y-axis) that a symbol be received at a specific radius, or amplitude (on the x-axis).

It is noted that in FIG. 3B, where SNR=40 dB, the original magnitudes are still distinguishable, despite the noise.

Figure 3C:
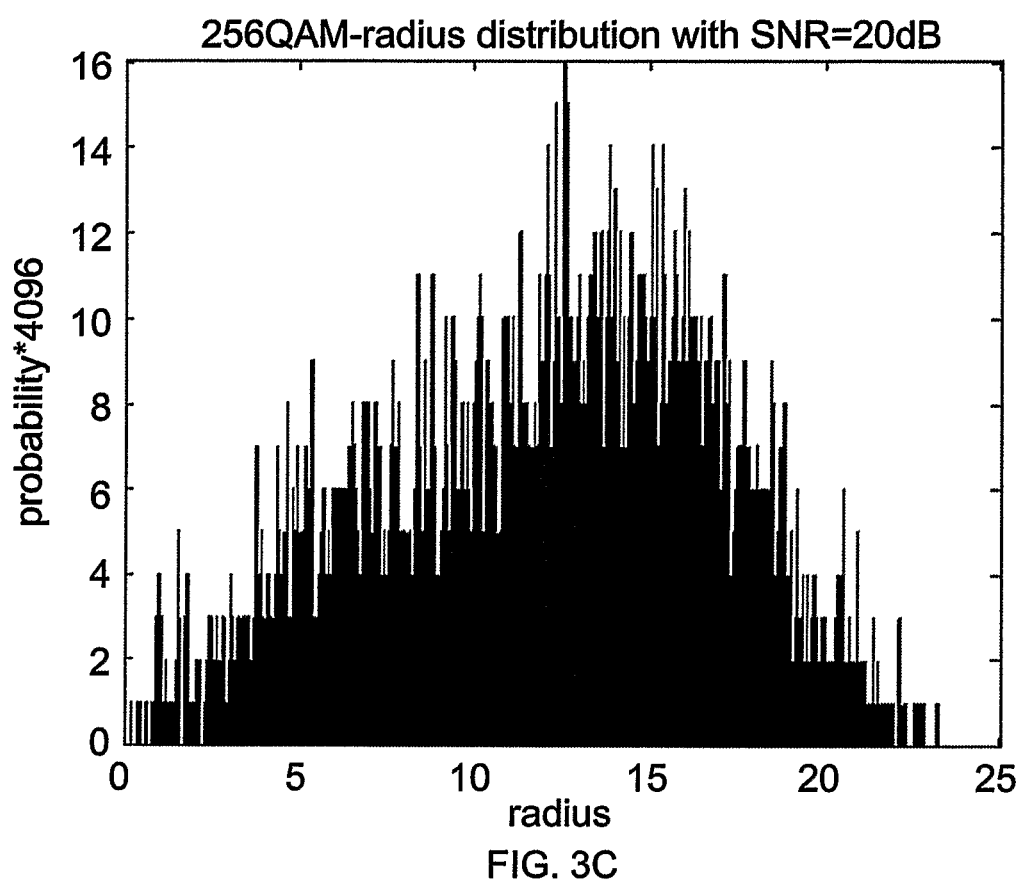
FIG. 3C is a graph illustrating a probability distribution of magnitudes of a 256 QAM signal with a signal having additive noise at SNR=20 dB.

Reference is now made to FIG. 3C, which is a probability distribution of magnitudes of a 256 QAM signal with a signal having additive noise at SNR=20 dB. FIG. 3C is also based on a simulation including 4096 samples.

FIG. 3C represents a noisier signal than the signal of FIG. 3B, and also depicts the probability (on the y-axis) that a symbol be received at a specific radius, or amplitude (on the x-axis).

It is noted that in FIG. 3C, where SNR=20 dB, the expected magnitudes are hard to distinguish due to the noise.

It is noted that FIGS. 3B and 3C depict magnitude envelopes of a noisy signal, yet the PDFs are noticeably similar to the noise free magnitude envelope depicted in FIG. 3A. Example embodiments of the invention use the above noted similarity in order to estimate noise, and from the noise estimate, to estimate SNR, as will be further explained below.

It is noted that FIGS. 3A-3C depict a relatively complex example case of a variable-magnitude variable-phase QAM signal. In an example case of a simpler signal, such as a fixed-magnitude variable-phase PSK signal, estimation of the magnitude distribution becomes simpler. The magnitude distribution is expected to be a constant.

An Approximation

A Probability Density Function (PDF) of sample signal magnitude is a mixed Ricean distribution, as described in the above-mentioned reference: "SNR Estimation for non-Constant Modulus Constellations", by Gao and Tepedelenlioglu, in IEEE Trans. Signal Processing vol. 53, no. 3, March 2005, pp. 865-870.

An approximation of a magnitude distribution function of samples of a typical ACM received signal, such as a 256 QAM signal, includes a combination of Gaussian noise having an unknown variance $\sigma_r^2$, with mathematical means represented as $\mu_1, \mu_2, \ldots, \mu_M$. The mathematical means are assumed equal to the magnitudes of symbols produced by the transmitter, and which are expected to be received at the receiver. A variance of the mathematical means is calculated.

It is noted that the approximation of the above-mentioned Ricean distribution by a Gaussian distribution is valid for a 256 QAM signal for a wide range of Signal to Noise Ratios, down to a SNR of 5 dB.

Real and imaginary components of a transmitted symbol with a magnitude r after rotation shall be denoted by $I_r$ and $Q_r$ respectively. A corresponding received magnitude is denoted by $Y_r$. $Y_r$ relates to $I_r$ and $Q_r$ in the following way:

$$Y_r = \sqrt{(I_r + n_i)^2 + (Q_r + n_q)^2} = \sqrt{r^2 + n^2 + 2(n_i \cdot I_r + n_q \cdot Q_r)} \quad \text{(Equation 5)}$$

in which $r^2 = I_r^2 + Q_r^2$ and $n^2 = n_i^2 + n_q^2$.

For a relatively low noise the received magnitude is approximated as follows:

$$Y_r = r\sqrt{1 + \frac{n^2 + 2(n_i \cdot I_r + n_q \cdot Q_r)}{r}} \approx r \cdot \quad \text{(Equation 6)}$$
$$\left(1 + \frac{n^2 + 2(n_i \cdot I_r + n_q \cdot Q_r)}{2r}\right) \approx \approx r \cdot$$

-continued $$\left(1 + \frac{2(n_i \cdot I_r + n_q \cdot Q_r)}{2r}\right)$$

$$= r + \frac{n_i \cdot I_r + n_q \cdot Q_r}{r}$$

$$= \tilde{Y}_r$$

The mathematical mean of $\tilde{Y}_r$ is r, since $n_i$ and $n_q$ are uncorrelated, zero-mean, random variables. The variance of $\tilde{Y}_r$ is expressed as:

$$\text{var}[\tilde{Y}_r] = E\left[\left(\frac{n_i \cdot I_r + n_q \cdot Q_r}{r}\right)^2\right] \quad \text{(Equation 7)}$$

$$= E\left[\frac{\frac{n^2}{2}r^2}{r^2}\right]$$

$$= E\left(\frac{n^2}{2}\right)$$

$$= \sigma_n^2/2$$

$$= \sigma_r^2$$

The variance, $\text{var}[\tilde{Y}_r]$ of equation 7, is used by example embodiments of the invention as representative of the radial noise power.

An alternative example embodiment of the SNR estimation method optionally makes use of an iterative Expectation Maximization (EM) method described in "*Maximum likelihood from incomplete data via the EM algorithm*", by Dempster, Laird & Rubin, Journal of the Royal Statistical Society, Series B (Methodological), Vol. 39, No. 1 (1977), pp. 1-38.

Figure 4:
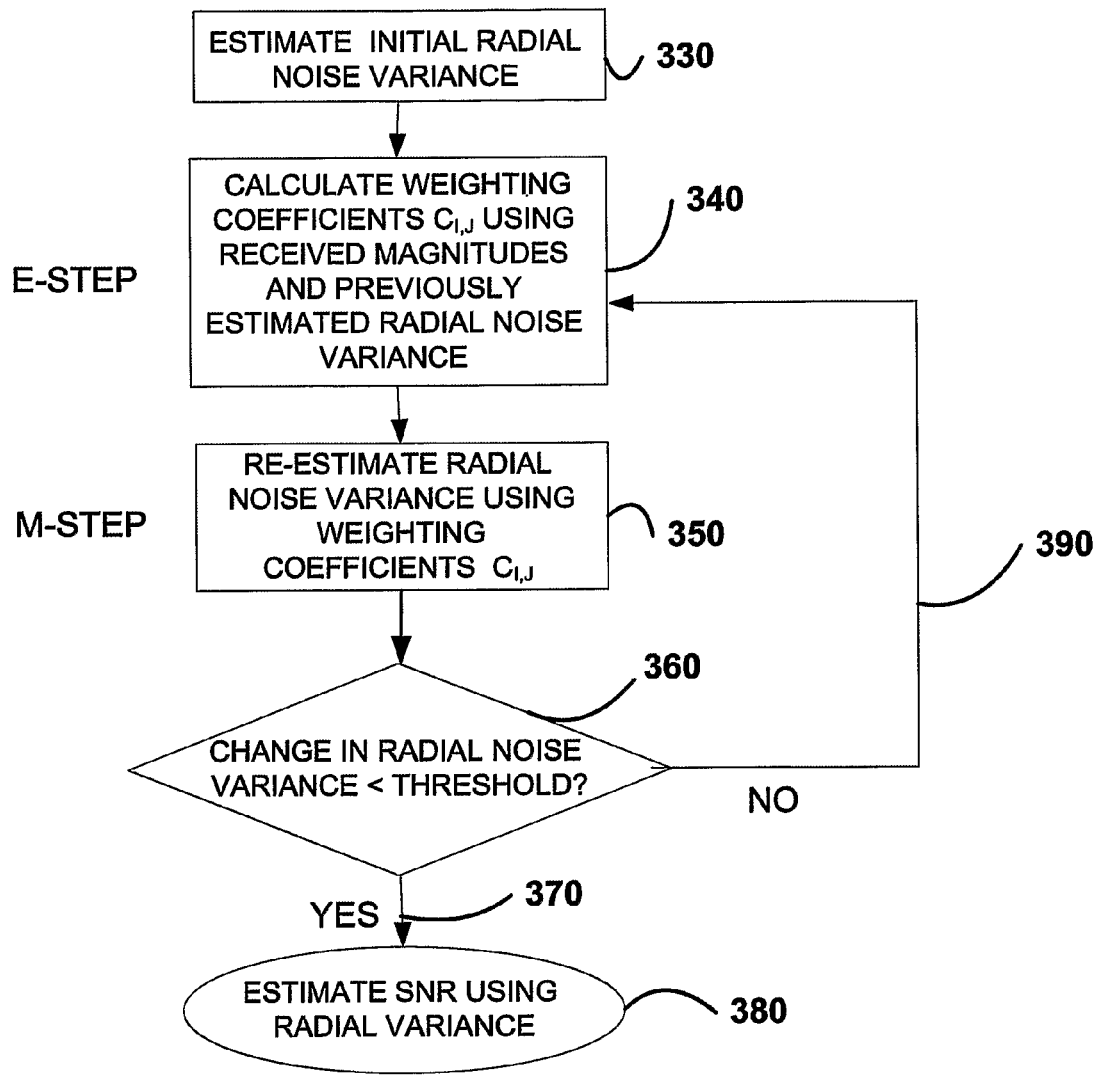
FIG. 4 is a simplified flow diagram of an SNR estimation method operative in accordance with an example embodiment of the present invention.

Reference is now made to FIG. 4, which is a simplified flow diagram of an SNR estimation method operative in accordance with an example embodiment of the present invention.

The SNR estimation method makes an initial estimation (330) of radial noise variance of a set of samples of a received signal, which includes a number of received symbols.

The initial estimation is optionally made by using radial slicing, which may optionally be a Maximum Likelihood, Non Data Aided (NDA), decision about the symbols, a method which is described further below. The initial estimation of the radial noise variance corresponds to having an expected magnitude distribution of a noise free signal, and estimating what additional noise has been added to obtain the actual radial noise variance.

Then the SNR estimation method proceeds by iterating two calculations. The first calculation provides weighting coefficients, which denote the probabilities that each of the received magnitudes is associated with each of the possible transmitted magnitudes given the noise estimate (340). The second calculation provides an estimate of the radial noise variance (350) by selecting the noise variance which maximizes the probability of obtaining the set of received magnitudes. The second calculation is based on the weighting coefficients obtained in the first calculation The above calculations and estimations are described in more detail below, with reference to the Expectation Maximization method.

The iterations continue—see decision box (360)—until a stop condition is reached. The stop condition is optionally reached, by way of a non-limiting example: when a change in the noise estimation falls below a threshold, as shown, but alternative stop conditions include when a threshold number of iterations has been made; when the time taken to estimate the SNR extends beyond a time limit; or some combination of the above-mentioned or other suitable stop conditions.

An Optional Initial Estimate—a Maximum Likelihood (ML) Solution Using a Hard Decision We use a variable $\theta = \sigma_r^2$ for denoting a parameter we wish to estimate, as is common in estimation theory literature. An estimate obtained at iteration k is denoted by $\hat{\theta}^{[k]}$.

An initial estimate (330) of the radial noise variance is calculated using hard decisions regarding the magnitudes of the received samples. A hard decision is hereby defined as picking a closest valid magnitude μ to a received magnitude y. Given the hard decisions, the estimation of the radial noise variance is optionally done using an ML approach. The ML approach takes a mathematical mean of a squared error between each measured magnitude and each corresponding associated hard decision.

$$\theta^{[0]} = \hat{\sigma}_r^2 = \frac{1}{N} \cdot \sum_{i=1}^{N} (y[i] - \mu_{HD}[i])^2 \quad \text{(Equation 8)}$$

An initial estimation of the SNR is expressed as $$SNR^{[0]} = 10 \cdot \log 10\left(\frac{\frac{1}{N} \cdot \sum_{i=1}^{N} y_i^2}{2 \cdot \theta^{[0]}} - 1\right) \quad \text{(Equation 9)}$$

Figure 5:
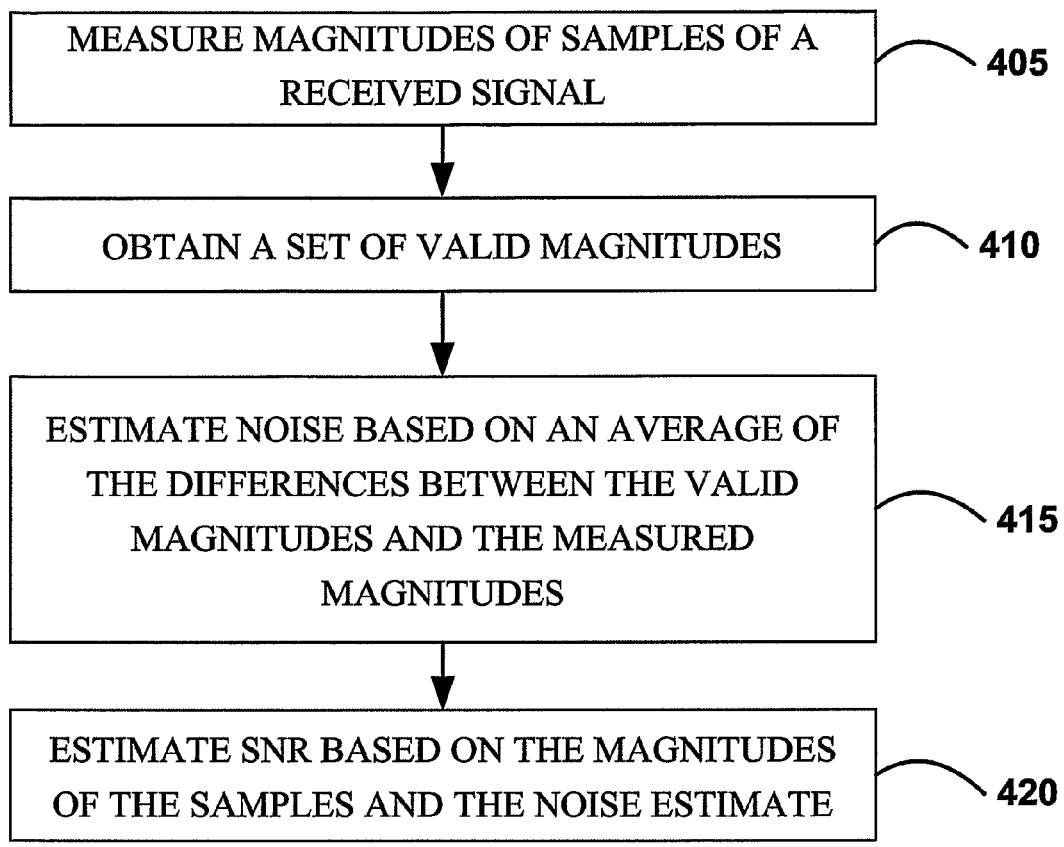
FIG. 5 is a simplified flow diagram of an SNR estimation method operative in accordance with an example embodiment of the present invention.

Reference is now made to FIG. 5, which is a simplified flow diagram of an SNR estimation method operative in accordance with an example embodiment of the present invention.

First, magnitudes of samples of a received signal are measured (405).

Next, a set of valid, expected, magnitudes is obtained (410), based, at least partly, on magnitudes of the samples.

Next, noise is estimated (415) by calculating an equally weighted sum-of-squares of the difference between each measured magnitude and a magnitude of a nearest-neighbor in the set of valid, expected, magnitudes. The calculation corresponds to Equation 8 above.

Next, SNR is estimated (420) based, at least partly, on the measured magnitudes of the samples and on the estimated noise, according to Equation 9 above.

It is noted that for high SNR values the SNR estimation method of FIG. 5 may provide an acceptable accuracy. For low SNR values an iterative method is optionally used, as described above with reference to FIG. 4. The iterative method of FIG. 4 optionally uses the noise estimate of FIG. 5 as an initial noise estimate.

Figure 6A:
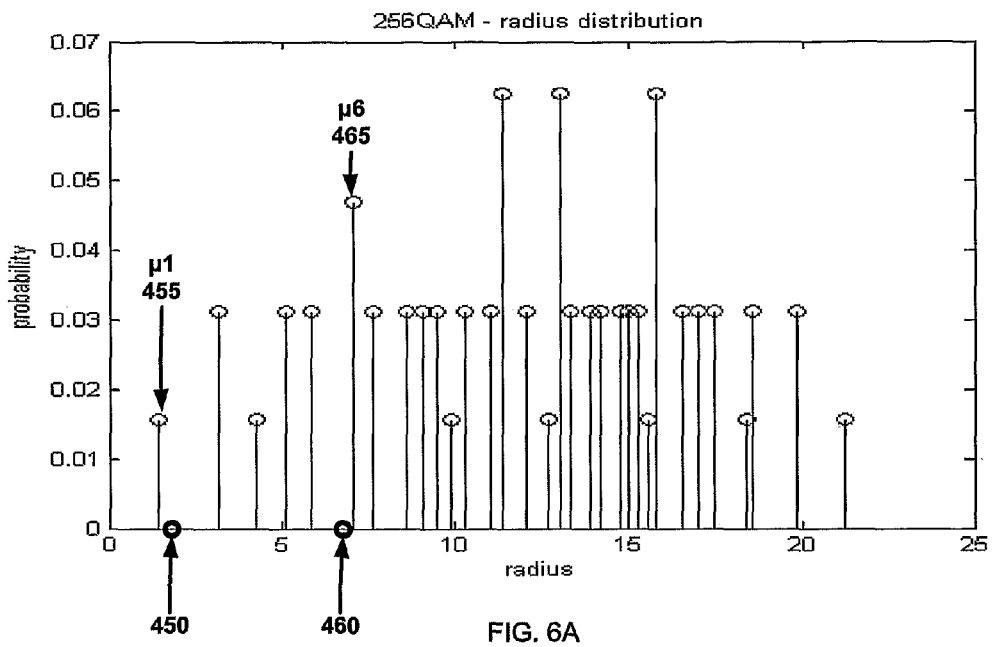
FIG. 6A is a graph illustrating an expected probability distribution of magnitudes of a 256 QAM signal with no additive noise; sampled magnitudes; and nearest-neighbor expected magnitudes, according to the method of FIG. 5.

Reference is now made to FIG. 6A, which is a graph illustrating an expected probability distribution of magnitudes of a 256 QAM signal with no additive noise; sampled magnitudes; and nearest-neighbor expected magnitudes, according to the method of FIG. 5.

FIG. 6A represents an expected distribution, which is equivalent to a pure signal with no additive noise, and depicts the probability (on the y-axis) that a symbol be received at a specific radius, or amplitude (on the x-axis).

In addition to the graph of expected probability distribution, putative sampled magnitudes 450 460 are depicted on the x-axis of the graph. The locations of the sampled magnitudes 450 460 along the x-axis depicts actual measured magnitudes. Nearest neighbor symbols 455 465 corresponding to the sampled magnitudes 450 460 are shown.

Figure 6B:
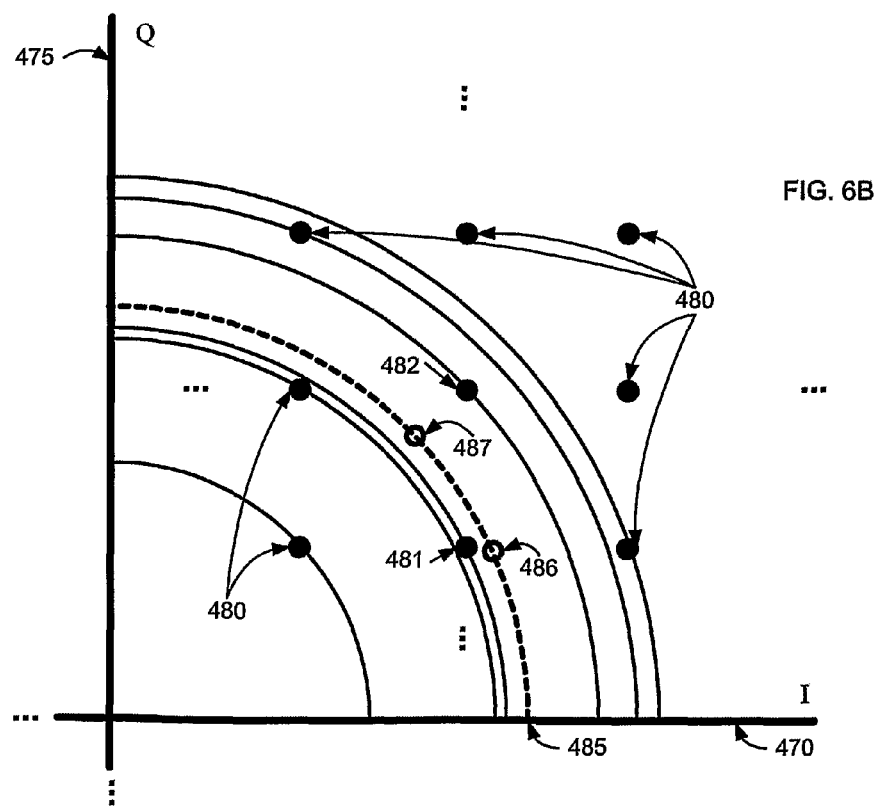
FIG. 6B is a graph illustrating some expected symbols in a 256 QAM signal; a sampled magnitude; and a nearest neighbor choice, according to the method of FIG. 5.

Reference is now made to FIG. 6B, which is a graph illustrating some expected symbols in a 256 QAM signal; a sampled magnitude; and a nearest neighbor choice, according to the method of FIG. 5.

In a 256 QAM signal, symbols have I values and Q values. The x-axis 470 of the graph denotes I values, and the y-axis of the graph denotes Q values. Some expected symbols 480 481 482 of the 256 symbols expected in a 256 QAM signal are depicted on the graph, placed not necessarily to any specific scale.

Some of the expected symbols 480 481 482 have a segment of a circle drawn through them, enabling comparison of magnitudes of the expected symbols 480 481 482. A segment of a circle is drawn depicting a putative sampled magnitude 485.

It is noted that the method of FIG. 5, as well as the methods of FIGS. 2 and 4, measure only magnitudes. Therefore it is not known, by the above-mentioned methods, whether the sampled magnitude is in a location 486 having a nearest neighbor the expected symbol 481, or is in a location 487 having a nearest neighbor the expected symbol 482.

It is noted that using the method of FIG. 5, the nearest neighbor of the putative sampled magnitude 485, under limitations of the depicted example, would be selected as the expected symbol 481.

It is noted that the method of FIG. 5 may be inaccurate, but that it works under conditions where no phase lock is necessary. Additionally, the method of FIG. 5 may produce an inaccurate estimate, which the method of FIGS. 2 and 4 may optionally improve.

Additional Methods for Making an Initial Noise Estimate

A magnitude of an expected symbol having a minimal magnitude of all the expected symbols, such as the magnitude of the symbol 480 at the bottom left of FIG. 6B, is typically well defined from magnitudes of other expected symbols. Some embodiments of the invention use only measured magnitudes smaller than the minimal expected magnitude to compare to the minimal expected magnitude, thereby estimating noise.

Some embodiments of the invention use only measured magnitudes below a threshold magnitude somewhere between the minimal expected magnitude and the next-higher expected magnitude to compare to the minimal expected magnitude, thereby estimating noise.

A magnitude of an expected symbol having a maximal magnitude of all the expected symbols, such as the magnitude of the symbol 480 at the top right of FIG. 6B, is typically well defined from magnitudes of other expected symbols. Some embodiments of the invention use only measured magnitudes larger than the maximal expected magnitude to compare to the maximal expected magnitude, thereby estimating noise.

Some embodiments of the invention use only measured magnitudes between a lower threshold and an upper threshold corresponding to a range containing a specific expected magnitude, comparing all measured magnitudes in the range to the expected magnitude, thereby estimating noise.

It has been stated above that embodiments of the invention optionally improve on a first noise estimate by iteratively calculating the probabilities that the expected magnitudes correspond to the measured magnitudes, given the noise estimate, and re-estimating a noise level which maximizes the probability of receiving the measured magnitudes given the expected magnitudes. A mathematical model of a transmitted signal and noise associated with the signal is now described, in order to explain the above statements.

Reference is now made again to FIG. 4, and the iterative Expectation Maximization (EM) method of FIG. 4 is now further described.

The Expectation Maximization (EM) Method

Let $\underline{y}$ denote N observations $(y_0, y_1, \ldots y_{N-1})$, which are measured magnitudes of N symbols. Let $\underline{\mu}=(\mu_0, \mu_1, \ldots, \mu_{N-1})$ denote the vector of magnitude associated with the transmitted symbols. Let $\underline{x}$ denote complete data $(\underline{y}, \underline{\mu})$. It is noted that the complete data $\underline{x}$ cannot be observed directly.

The likelihood of the complete data $\underline{x}$ given the parameter to be estimated is given by:

$$l_x = f(\underline{x} \mid \theta) \quad \text{(Equation 10)}$$
$$= f(\underline{y}, \underline{\mu} \mid \sigma_r^2)$$
$$= P(\underline{y} \mid \underline{\mu}, \sigma_r^2) \cdot P(\underline{\mu} \mid \sigma_r^2)$$
$$= \prod_{i=1}^{N} \frac{1}{\sqrt{2\pi \cdot \sigma_r^2}} \cdot \exp\left(-\frac{(y_i - \mu_i)}{2 \cdot \sigma_r^2}\right) \cdot P(\mu_i)$$

The log-likelihood function is defined as:

$$L_x = \log(l_x) \quad \text{(Equation 11)}$$
$$= \log[f(\underline{x} \mid \theta)]$$
$$= -\frac{N}{2}\log(2\pi \cdot \sigma_r^2) - \sum_{i=1}^{N}\left[\left(\frac{y_i - \mu_i}{2 \cdot \sigma_r^2}\right) - \log(P(\mu_i))\right]$$

It is desirable to find $\theta = \sigma_r^2$ which maximizes log $[f(\underline{x}|\theta)]$, but complete data $\underline{x}$, that is the magnitude associated with every measurement, is not available to compute log-likelihood. Instead, an expectation of log $[f(\underline{x}|\theta)]$ is maximized, given data $\underline{y}$ and our current estimate of $\theta$, which is denoted by $\hat{\theta}^{[k]}$. An iterative maximization is expressed in two steps, an Expectation step (E-step) and a Maximization step (M-step), which repeat iteratively.

The E-Step (340)

For the E-step compute:

$$S(\theta \mid \hat{\theta}^{[k]}) = E_x\{\log[f(\underline{x} \mid \theta)] \mid \underline{y}, \hat{\theta}^{[k]}\} \quad \text{(Equation 12)}$$
$$= E_\mu\{L_x(\underline{y})\} =$$
$$= \sum_{j=1}^{M}\left[-\frac{N}{2}\log(2\pi \cdot \sigma_r^2) - \sum_{i=1}^{N}\right.$$
$$\left.\left(\frac{y_i - \mu_j}{2 \cdot \sigma_r^2} - \log(P(\mu_j))\right)\right] \cdot P[\mu_j \mid y_i, \hat{\theta}^{[k]}]$$
$$= \sum_{i=1}^{N}\sum_{j=1}^{M}\left(-\frac{1}{2}\log(2\pi \cdot \sigma_r^2) - \frac{y_i - \mu_j}{2 \cdot \sigma_r^2} - \log(P(\mu_j))\right) \cdot$$
$$\frac{N(y_i - \mu_j, \hat{\theta}^{[k]}) \cdot P(\mu_j)}{\sum_{l=1}^{M} N(y_i - \mu_l, \hat{\theta}^{[k]}) \cdot P(\mu_j)}$$

Where S denotes the probability of the noise estimate $\hat{\theta}^{[k]}$ corresponding to the actual noise θ, M denotes a number of valid magnitudes and $N(\mu,\sigma^2)$ represents a normal distribution as follows:

$$N(\mu, \sigma^2) = \frac{1}{\sqrt{2\Pi\sigma^2}} \cdot \exp\left(-\frac{\mu^2}{2\sigma^2}\right) \quad \text{(Equation 13)}$$

In short, the following notation is used:

$$C_{i,j} = P[\mu_j \mid y_i, \hat{\theta}^{[k]}] \quad \text{(Equation 14)}$$

$$= \frac{N(y_i - \mu_j, \hat{\theta}^{[k]}) \cdot P(\mu_j)}{\sum_{l=1}^{M} N(y_i - \mu_l, \hat{\theta}^{[k]}) \cdot P(\mu_l)}$$

Coefficients $C_{i,j}$ are calculated (340). Substituting Equation 14 into Equation 12 yields:

$$S(\theta \mid \hat{\theta}^{[k]}) = \quad \text{(Equation 15)}$$

$$-\frac{N}{2}\log(2\pi \cdot \sigma_r^2) - \sum_{i=1}^{N-1}\sum_{j=1}^{M}\left(\frac{y_i - \mu_j}{2 \cdot \sigma_r^2} - \log(P(\mu_j))\right) \cdot C_{i,j}$$

where S is the probability of θ given $\hat{\theta}^{[k]}$.

The M-Step (350)

For an M-step let $\hat{\theta}^{[k+1]}$ be a value of θ which maximizes S:

$$\hat{\theta}^{[k+1]} = \underset{\theta}{\arg\max} S(\theta \mid \hat{\theta}^{[k]}) \quad \text{(Equation 16)}$$

The maximization is with respect to a first argument of the S function. A

Maximum Likelihood (ML) estimate of the parameter is obtained by taking a derivative of the Q function and equating the derivative to zero:

$$0 = \frac{d}{d\theta} S(\theta \mid \hat{\theta}^{[k]}) \quad \text{(Equation 17)}$$

$$= \frac{d}{d\sigma_r^2} S(\sigma_r^2 \mid \hat{\theta}^{[k]})$$

$$= -\frac{N}{2 \cdot \sigma_r^2} + \sum_{i=1}^{N}\sum_{j=1}^{M}\left(\frac{y_i - \mu_j}{2 \cdot (\sigma_r^2)^2}\right) \cdot C_{i,j}$$

Multiplying by $2 \cdot \sigma_r^2$ and rearranging the previous expression yields:

$$\hat{\theta}^{[k+1]} = \frac{1}{N} \cdot \sum_{i=1}^{N}\sum_{j=1}^{M}(y_i - \mu_j)^2 \cdot C_{i,j}(\hat{\theta}^{[k]}, y_i, \mu_j) \quad \text{(Equation 18)}$$

Where $C_{i,j}$ is as defined in Equation 14.

The parameter $\hat{\theta}^{[k+1]}$ of Equation 18 denotes the noise variance after performing k+1 iterations. The parameter $y_i$ denotes the magnitude of sample i in the set of sampled magnitudes. The parameter $\mu_j$ denotes a possible transmitted magnitude from a set of expected magnitudes. The expression $(y_i - \mu_j)^2$ denotes the noise power at sample i if the actual transmitted magnitude had been $\mu_j$. Since the actual transmitted magnitude is not known, all possible magnitudes are considered, by letting j run from 0 to M−1. For each possible transmitted magnitude at sample i there is a scaling factor C which dictates how to scale the corresponding noise. The scaling factor C depends on $y_i, \mu_j$, and on the estimated noise variance at a previous iteration $\hat{\theta}^{[k]}$.

A value of $\hat{\theta}^{[k+1]}$ is calculated (350). The value of $\hat{\theta}^{[k+1]}$ is compared with a previous value $\hat{\theta}^{[k]}$. The difference between $\hat{\theta}^{[k+1]}$ and $\hat{\theta}^{[k]}$ is the noise variance modification in a present iteration.

The noise variance modification in the present iteration is optionally compared to a threshold (360).

If the modification is less than the threshold (370), then SNR is calculated (380) using the calculated noise variance $\hat{\theta}^{[k+1]}$. SNR is optionally calculated according to Equation 9, using $\hat{\theta}^{[k+1]}$ to replace $\theta^{[0]}$.

If the modification is not less than the threshold (390), then an additional iteration of the E step (340), the M step (350), and the comparison (360) is performed again.

As iterations proceed, the estimated noise variance becomes more and more accurate and so does the scaling factor C.

It is noted that as iterations proceed, the magnification and/or attenuation of the expected magnitudes and/or the received magnitudes, described above with reference to FIG. 2B, may optionally be repeated, in order that the expected magnitudes and the received magnitudes continue to extend a substantially equal range of values.

The iterations optionally proceed until a stopping criterion is reached. An optional stopping criterion is when difference in the estimated noise variance between two consecutive iterations becomes less than a threshold difference.

Other stopping criteria are optionally defined as well. Some non limiting examples of stopping criteria are: a maximal number of iterations; and an amount of time which has passed during estimation of the SNR.

In some embodiments of the invention the stopping criteria is a combination of more than one stopping criteria.

Various embodiments and aspects of the present invention as delineated hereinabove and as claimed in the claims section below find support in the following example simulations.

SNR Estimation Simulations

Figure 7:
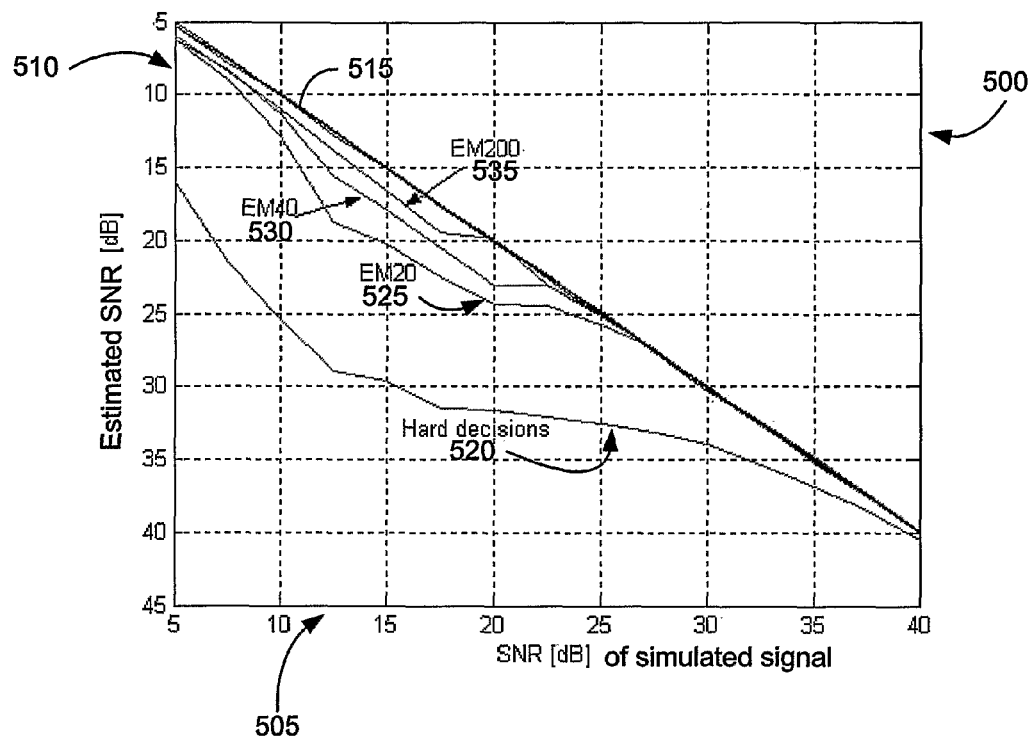
FIG. 7 is a graph depicting results of SNR estimation according to the SNR estimation method of FIG. 4, on simulated noisy signals.

Reference is now made to FIG. 7, which is a graph 500 depicting results of SNR estimation according to the SNR estimation method of FIG. 4, on simulated noisy signals.

The X axis 505 of the graph 500 depicts actual SNR of a simulated 256 QAM signal. The signal comprises 4096 simulated magnitudes of demodulated symbols. The SNR varies between 5 and 40 dB.

The Y axis 510 of the graph 500 depicts estimated SNR as estimated by the SNR estimation method of FIG. 4. The SNR varies between 5 and 45 dB.

A first diagonal line 515 indicates an accurate estimate, namely where the estimated SNR equals the actual SNR.

A second line 520 depicts values of initial SNR estimations made by maximum likelihood estimations alone, and corresponding to box 330 of FIG. 4. It is noted that the second line 520 converges with the accurate estimate at about 40 dB but loses accuracy beyond about 30 dB.

It is noted that other methods are possible for obtaining initial SNR estimations.

One non limiting example of another method for obtaining an initial SNR estimation is to use a subset of the expected magnitudes, and compare to a subset of the received magnitudes. For example, using only the lowest expected magnitude, and comparing to all received magnitudes which are not nearest-neighbors to other expected magnitudes. It is noted that in low expected magnitudes, the density of expected magnitudes is low, as may be seen in FIG. 6B. The distance between the low expected magnitudes is relatively large. Measured magnitudes which are lower than the lowest expected magnitude are associated with the lowest expected magnitude with high probability. SNR estimation based on low magnitudes only may result in a good initial estimation.

The above-described method for initial estimation requires a larger number of samples, since only some of the samples have magnitudes corresponding to lowest expected magnitudes.

Another example method for initial estimation uses only the highest expected magnitude, and compares to all received magnitudes which are not nearest-neighbors to other expected magnitudes.

Yet another example method for initial estimation uses extreme magnitudes, both highest and lowest.

A third line 525 depicts values of SNR estimations made after 20 iterations, and corresponds to 20 iterations of boxes 340, 350, and 360 of FIG. 4.

A fourth line 530 depicts values of SNR estimations made after 40 iterations.

A fifth line 535 depicts values of SNR estimations made after 200 iterations.

It is noted that since the above mentioned SNR estimation method converges to final values by iteration, accuracy of initial estimates is not very critical.

It is noted that in estimating SNR using the SNR estimation method of FIG. 4, 4096 samples are enough for estimating with an error of less than 1 dB, down to an SNR of approximately 5 dB.

How much time it may take to estimate SNR using the above-mentioned method depends, among other parameters, on a transmission rate and a calculation rate. Some example calculations of the time are now provided.

When transmitting at a rate of 50 mega-symbols/second, it takes approximately 4096/50 MHz=82 microseconds to measure the sampled magnitudes. There are ~30 different magnitudes in 256 QAM. Equation 18 requires ~30*4096 calculations. If each calculation is done at the symbol rate, it takes 30 times longer to perform one iteration than to measure the sampled magnitudes. It takes ~30*20=600 times longer to calculate 20 iterations. So the time taken for SNR estimation is ~600*82 microseconds, or 50 milliseconds When the symbol rate is low, for example 1 mega-symbol/second, and calculation is done using a clock of 200 MHz, the calculation time becomes relatively faster.

It is noted that typical prior art methods may need millions of samples in order to approach the accuracy obtained by this method, and therefore require much more time for estimating SNR. Additionally, sampling a large amount of data is not always appropriate. In fast fading channels, it may not be possible to wait to obtain millions of samples, as the SNR changes faster than the time it would take to obtain the samples.

Some embodiments of the invention are also optionally applied to streaming data. Each iteration updates the estimated noise variance by using a set of coefficients $-C_{i,j}$, and a set of sampled magnitudes (Equation 18). The set of sampled magnitudes and the corresponding coefficients are optionally associated with newly arrived data. A newly estimated noise variance is optionally combined with a previously estimated noise variance in a linear fashion, with a predetermined scaling factor. An optional method of application of the embodiments of the invention to streaming data is now described in more detail.

An estimated noise variance after k samples have been processed is denoted by $\hat{\theta}^{[k]}$, and a newly arrived set of sampled magnitudes is denoted by $y_i$, where $i=1, 2, \ldots N$. The number of magnitudes in the set may even be N=1, in which case there is a single new magnitude measurement. In order to update the estimated noise variance with the newly arrived set of sampled magnitudes, for each of the magnitudes in the set, evaluate the coefficients $C_{i,j}$ according to Equation 14. The noise variance as estimated from the new set is obtained using Equation 18, and the noise variance is denoted by $\tilde{\theta}^{[k+1]}$. In order to combine the newly estimated noise variance $\tilde{\theta}^{[k+1]}$, with the previously estimated noise variance $\hat{\theta}^{[k]}$, embodiments of the invention optionally perform a linear combination with a scaling factor $\alpha$, where $0<\alpha<1$. The combined noise variance is obtained as follows:

$$\hat{\theta}^{[k+1]} = \alpha \cdot \hat{\theta}^{[k]} + (1-\alpha) \cdot \tilde{\theta}^{[k+1]} \quad \text{(Equation 19)}$$

When $\alpha$ is close to 1, the effect of the previously estimated noise variance $\hat{\theta}^{[k]}$ is large. The smaller $\alpha$ is, the more weight is given to the newly estimated noise variance $\tilde{\theta}^{[k+1]}$, enabling fast tracking of the noise variance at an expense in accuracy.

The noise variance as estimated by Equation 19 is optionally used to provide better coefficients $C_{i,j}$ for the newly arrived set of sampled magnitudes $y_i$. Noise estimation proceeds iteratively until some stopping criterion has been met, as has been described above.

An Example Application of SNR Estimation According to the Invention

For communication systems with fading channels it is important that SNR be measured. Presently, as described above in the Background section, such measurement is done in a decision directed manner. When a signal starts fading, a receiver typically fails at its weakest link. The weak link in a receiver is often a carrier phase tracking mechanism. When the receiver stops tracking a received signal's phase, output from a demodulator becomes corrupt, and an SNR estimated based on a decision directed approach estimates SNR significantly worse than an actual SNR. If such a system uses ACM, the system typically responds by switching to a very low bit rate, lower than necessary.

A communication system incorporating an embodiment of the invention is able to estimate SNR with high accuracy, as demonstrated above with reference to FIG. 7, and low delay. The delay, by way of a non-limiting example, can be a delay of 4096 symbols, as demonstrated above with reference to FIG. 7. The SNR estimator is capable of producing SNR estimations even when the carrier phase tracking mechanism fails to produce correct phase estimations. Therefore a receiver using the SNR estimator provides better SNR estimates than a receiver which estimates SNR using a decision directed approach, especially when the carrier phase tracking mechanism fails to produce correct phase estimations.

An Example Application in a Backup System

Some wireless point-to-point communication systems use a protection mechanism. The protection mechanism aims at protecting a system from hardware failures by using some redundant backup components. The backup components are connected in parallel with main equipment.

In an event of a main receiver being unable to provide transmitted information due to a hardware failure, the communication system switches to a backup receiver. However, the backup receiver may be connected, and often is connected, such that the backup receiver receives a lower signal level. The lower signal level results from enabling a main receiver to receive more than half of available signal power, in order to function as well as possible, providing a maximal communication rate.

Such asymmetric configuration, especially in ACM communication systems, where bit rate is usually maximized all the way up to an acceptable limit of SNR, may cause the backup receiver to be in a state in which it is unable to track a carrier phase. However, operation of the backup receiver is verified by estimating received signal SNR. Embodiments of the SNR estimator described herein, when used for estimating SNR in the backup receiver, are capable of verifying that the backup receiver is operating even when the backup receiver is not necessarily tracking the carrier phase.

Figure 8:
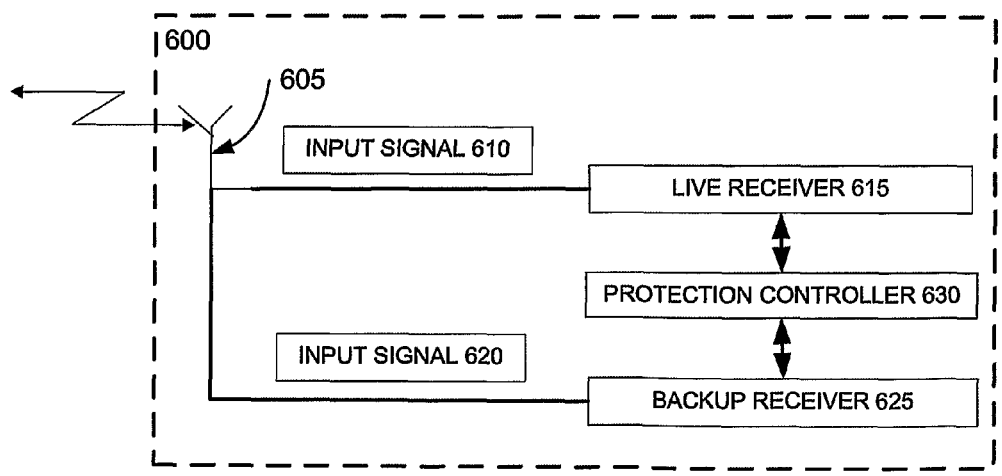
FIG. 8 is a simplified diagram of a redundant receiver configuration in a protected communication system.

Reference is now made to FIG. 8, which is a simplified diagram of a redundant receiver configuration 600 in a protected communication system.

The redundant receiver configuration 600 comprises an antenna 605, providing a first input signal 610 to a live receiver 615 and a second input signal 620 to a backup receiver 625. As described above, the first input signal 610 and the second input signal 620 are typically split from the antenna 605 equally or asymmetrically, such that the live receiver 615 receives equal or more power than the backup receiver 625.

The redundant receiver configuration 600 also comprises a protection controller 630, which tracks operation of both the live receiver 615 and the backup receiver 625. The protection controller 630 optionally tracks operation of the receivers at least by tracking their SNR levels.

If the backup receiver 625 has an SNR level substantially higher than the live receiver 615, the protection controller 630 optionally switches from using the live receiver 615 to using the backup receiver 625, and vice versa.

It is noted that only one of the live receiver 615 and the backup receiver 625 may use an embodiment of the blind SNR estimation method of the invention, or both of the live receiver 615 and the backup receiver 625 may use the embodiment of the blind SNR estimation method of the invention.

It is noted that the backup receiver 625 may receive a weaker signal than the live receiver 615, and therefore not be able to lock phase with the input signal 620. The backup receiver may use an embodiment of the invention and produce an SNR estimate despite not being phase locked to the input signal 620.

It is expected that during the life of a patent maturing from this application many relevant communication systems, and ACM communication schemes, will be developed and the scopes of the terms communication system, and ACM communication scheme, is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for estimating a Signal to Noise Ratio (SNR) in a received signal comprising:

for a fixed first set of a plurality of samples from the received signal, providing an initial noise estimate;

starting with the initial noise estimate, iteratively improving the noise estimate using an iterative Expectation Maximization (EM) method comprising:

(a) calculating a matrix of probability coefficients $C_{i,j}$ indicating probabilities of each one of a set of valid magnitudes $\mu_j$ corresponding to each one of measured magnitudes $y_i$ of the samples, given the noise estimate; and (b) re-estimating the noise estimate to maximize a likelihood of obtaining the measured magnitudes $y_i$, given the matrix of probability coefficients $C_{i,j}$, the set of valid magnitudes, and the previous noise estimate; and repeating (a) and (b) until reaching a stop criterion; and estimating SNR based, at least partly, on the fixed first set of samples from the received signal and the noise estimate.

2. The method of claim 1 in which the iteratively improving includes a fixed additional set of samples from the received signal and iteratively improving the noise estimate based, at least in part, on both the fixed first set of samples and the fixed additional set of samples.

3. The method of claim 2 in which a first noise estimate is based on the fixed first set of samples, an additional noise estimate is based on the fixed additional set of samples, and a final noise estimate, on which the estimating SNR is at least partly based, is a linear combination of the first noise estimate and the additional noise estimate.

4. The method of claim 2, and further having more than one additional fixed sets of noise estimates, and estimating SNR based, at least partly, on combining noise estimates from each of the first noise estimate and the additional noise estimates.

5. The method of claim 1 irrespective of whether a receiver receiving the signal is phase-locked.

6. A method for estimating a Signal to Noise Ratio (SNR) in a received signal comprising:

for a fixed set of a plurality of samples from the received signal, measuring magnitudes of the samples;

obtaining a set of valid magnitudes, based, at least partly, on the measured magnitudes and on an expected modulation scheme;

providing an initial noise estimate based, at least partly, on the measured magnitudes;

starting with the initial noise estimate (a) calculating a matrix of probability coefficients $C_{i,j}$ indicating probabilities of each valid magnitude $\mu_j$ to correspond to each measured magnitude $y_i$, given the noise estimate;

(b) selecting a noise estimate which maximizes a likelihood of sampling the measured magnitudes, given the matrix of probability coefficients $C_{i,j}$, the measured magnitudes, and the previous noise estimate; and estimating SNR based, at least partly, on the measured magnitudes and the noise estimate.

7. The method of claim 6 in which (a) and (b) are repeated until reaching a stop criterion.

8. The method of claim 7 in which the stop criterion includes iterating no more than a specified period of time.

9. A method for estimating a Signal to Noise Ratio (SNR) in a received signal comprising:

measuring magnitudes of a fixed set of a plurality of samples from the received signal;

obtaining a set of valid magnitudes, based, at least partly, on the measured magnitudes and on an expected modulation scheme of the received signal;

calculating a noise estimate based on the differences between the set of valid magnitudes and the measured magnitudes; and estimating SNR based, at least partly, on the measured magnitudes and on the noise estimate.

10. The method of claim 9 in which the calculating a noise estimate is based on an equally weighted average of the differences between the set of valid magnitudes and the measured magnitudes.

11. The method of claim 9 in which the calculating a noise estimate comprises Non-Data-Aided decisions about the set of samples of the received signal.

12. The method of claim 9 in which the calculating a noise estimate is performed as follows:

for each measured magnitude in the set of samples:

subtracting the measured magnitude from a nearest magnitude in the set of valid magnitudes, thereby calculating a single difference; and squaring the single difference, and summing the squares of the single differences and dividing by the number of measured magnitudes.

13. The method of claim 12 in which the subtracting and the squaring is performed only for measured magnitudes above a threshold magnitude.

14. The method of claim 13 in which the threshold magnitude is between a maximum expected magnitude and a next-smaller expected magnitude.

15. The method of claim 12 in which the subtracting and the squaring is performed only for measured magnitudes between a lower threshold and an upper threshold.

16. A method for estimating a Signal to Noise Ratio (SNR) in a received signal comprising:

for a fixed first set of a plurality of samples from the received signal, providing an initial noise estimate;

starting with the initial noise estimate, iteratively improving the noise estimate; and estimating SNR based, at least partly, on the fixed first set of samples from the received signal and the noise estimate, in which the providing an initial noise estimate comprises providing a noise estimate according to claim 9.

* * * * *